US012655882B2

(12) United States Patent (10) Patent No.: US 12,655,882 B2
Yoshikawa et al. (45) Date of Patent: Jun. 16, 2026

(54) VIBRATION DEVICE

(71) Applicant: Prospira Corporation, Kawasaki city (JP)

(72) Inventors: Mao Yoshikawa, Kawasaki city (JP); Shunji Sato, Kawasaki city (JP)

(73) Assignee: Prospira Corporation, Kawasaki city (JP)

( * ) Notice: Subject to any disclaimer, the term of this patent is extended or adjusted under 35 U.S.C. 154(b) by 335 days.

(21) Appl. No.: 18/568,942

(22) PCT Filed: Nov. 29, 2021

(86) PCT No.: PCT/JP2021/043577
§ 371 (c)(1),
(2) Date: Dec. 11, 2023

(87) PCT Pub. No.: WO2023/276191
PCT Pub. Date: Jan. 5, 2023

(65) Prior Publication Data
US 2024/0271677 A1 Aug. 15, 2024

(30) Foreign Application Priority Data
Jun. 29, 2021 (JP) .................................. 2021-107982

(51) Int. Cl.
| *B62D 24/02* | (2006.01) |
| *F16F 3/087* | (2006.01) |
| *F16F 15/08* | (2006.01) |

(52) U.S. Cl.
CPC ............ *F16F 3/0876* (2013.01); *F16F 15/08* (2013.01); *F16F 2224/025* (2013.01);
(Continued)

(58) Field of Classification Search
CPC .... F16F 3/0876; F16F 15/08; F16F 2224/025; F16F 2230/02; F16F 2230/36;
(Continued)

(56) References Cited

U.S. PATENT DOCUMENTS 5,158,269 A * 10/1992 Hein ....................... F16F 3/093
267/141.1
2007/0296128 A1 12/2007 Asano et al.
(Continued)

FOREIGN PATENT DOCUMENTS

CN 103559703 A 2/2016
CN 105339702 A 3/2016
(Continued)

OTHER PUBLICATIONS

Dec. 14, 2023, International Preliminary Report on Patentability issued in the International Patent Application No. PCT/JP2021/043577.
(Continued)

*Primary Examiner* — Amy J. Sterling
(74) *Attorney, Agent, or Firm* — KENJA IP LAW PC

(57) ABSTRACT

Provided is an anti-vibration device (1) including: a first anti-vibration rubber cylinder (11) that connects a vibration generating portion and a vibration receiving portion in a first direction; a second anti-vibration rubber cylinder (12) that sandwiches one of the vibration generating portion and the vibration receiving portion in the first direction between the first anti-vibration rubber cylinder (11) and itself; and a support member (13) that sandwiches the second anti-vibration rubber cylinder (12) in the first direction between the one of the portions and itself, wherein the first anti-vibration rubber cylinder (11) and the second anti-vibration rubber cylinder (12) are provided with respective central axes (O) thereof extending in the first direction, and periph-
(Continued)

eral grooves (15) are formed separately on an outer peripheral surface and an inner peripheral surface of at least one of the first anti-vibration rubber cylinder (11) and the second anti-vibration rubber cylinder (12).

2 Claims, 3 Drawing Sheets

(52) U.S. Cl.
CPC ....... *F16F 2230/02* (2013.01); *F16F 2230/36* (2013.01); *F16F 2232/08* (2013.01); *F16F 2234/02* (2013.01)

(58) Field of Classification Search
CPC .. F16F 2232/08; F16F 2234/02; F16F 1/3732; F16F 3/087
See application file for complete search history.

(56) References Cited

U.S. PATENT DOCUMENTS

| | | | | |
|---|---|---|---|---|
| 2009/0134292 | A1* | 5/2009 | Kubat | F16F 3/093 |
| | | | | 248/222.51 |
| 2015/0345583 | A1 | 12/2015 | Ishikawa et al. | |

| | | | | |
|---|---|---|---|---|
| 2016/0146283 | A1 | 5/2016 | Sato et al. | |
| 2019/0344831 | A1* | 11/2019 | Asai | F16F 3/0873 |

FOREIGN PATENT DOCUMENTS

| | | | |
|---|---|---|---|
| JP | 2003335261 | A | 11/2003 |
| JP | 2004150596 | A | 5/2004 |
| JP | 2004291795 | A | 10/2004 |
| JP | 4256278 | B2 | 4/2009 |
| JP | 2020190268 | A | 11/2020 |

OTHER PUBLICATIONS

Jul. 8, 2025, search result of the Extended European Search Report issued by the European Patent Office in the corresponding European Patent Application No. 21948494.6.

Dec. 28, 2021, International Search Report issued in the International Patent Application No. PCT/ JP2021/043577.

Mar. 18, 2026, search result of Office Action issued by the China National Intellectual Property Administration in the corresponding Chinese Patent Application No. 202180099958.9.

* cited by examiner

FIG. 1

VIBRATION DEVICE

TECHNICAL FIELD

The present disclosure relates to an anti-vibration device. The present application claims priority to the Japanese Patent Application No. 2021-107982, filed on Jun. 29, 2021, the contents of which are incorporated herein by reference.

BACKGROUND

For example, an anti-vibration device, such as the one illustrated in Patent Literature (PTL) 1 below, is known. The anti-vibration device includes a first anti-vibration rubber cylinder connecting a vibration generating portion and a vibration receiving portion in a first direction, a second anti-vibration rubber cylinder sandwiching one of the vibration generating portion and the vibration receiving portion in the first direction between the first anti-vibration rubber cylinder and the second anti-vibration rubber cylinder, and a support member sandwiching the second anti-vibration rubber cylinder in the first direction between the one of the vibration generating portion and the vibration receiving portion and the support member. The first anti-vibration rubber cylinder and the second anti-vibration rubber cylinder are provided with their respective central axes extending in the first direction.

CITATION LIST

Patent Literature

PTL 1: JP 2004-150596 A1

SUMMARY

Technical Problem

However, in the aforementioned conventional anti-vibration device, for example, in a process in which the second anti-vibration rubber cylinder is compressed and deformed in the first direction, an end of the second anti-vibration rubber cylinder that is located closer to the one of the vibration generating portion and the vibration receiving portion along the first direction is deformed in a radial direction, and as a result, the second anti-vibration rubber cylinder is not compressed and deformed straight in the first direction but is distorted. This deteriorates a static spring of the second anti-vibration rubber cylinder, thus making it difficult to ensure durability of the second anti-vibration rubber cylinder.

This problem may also occur with the first anti-vibration rubber cylinder.

The present disclosure has been conceived in light of such circumstances and aims to provide an anti-vibration device in which at least one of the first anti-vibration rubber cylinder and the second anti-vibration rubber cylinder can be easily compressed and deformed straight in the first direction.

Solution to Problem

In order to solve the above problem and achieve this aim, an aspect of the present disclosure resides in an anti-vibration device including:

a first anti-vibration rubber cylinder configured to connect a vibration generating portion and a vibration receiving portion to each other in a first direction;

a second anti-vibration rubber cylinder configured to sandwich one of the vibration generating portion and the vibration receiving portion in the first direction between the first anti-vibration rubber cylinder and the second anti-vibration rubber cylinder; and a support member configured to sandwich the second anti-vibration rubber cylinder in the first direction between the one of the vibration generating portion and the vibration receiving portion and the support member, wherein the first anti-vibration rubber cylinder and the second anti-vibration rubber cylinder are provided with respective central axes thereof extending in the first direction, and peripheral grooves are formed separately on an outer peripheral surface and an inner peripheral surface of at least one of the first anti-vibration rubber cylinder and the second anti-vibration rubber cylinder.

Advantageous Effect

According to the present disclosure, at least one of the first anti-vibration rubber cylinder and the second anti-vibration rubber cylinder can be easily compressed and deformed straight in the first direction.

BRIEF DESCRIPTION OF THE DRAWINGS

In the accompanying drawings:

FIG. 1 is a longitudinal cross-sectional view of an anti-vibration device illustrated as an embodiment;

DETAILED DESCRIPTION

Figure 1:
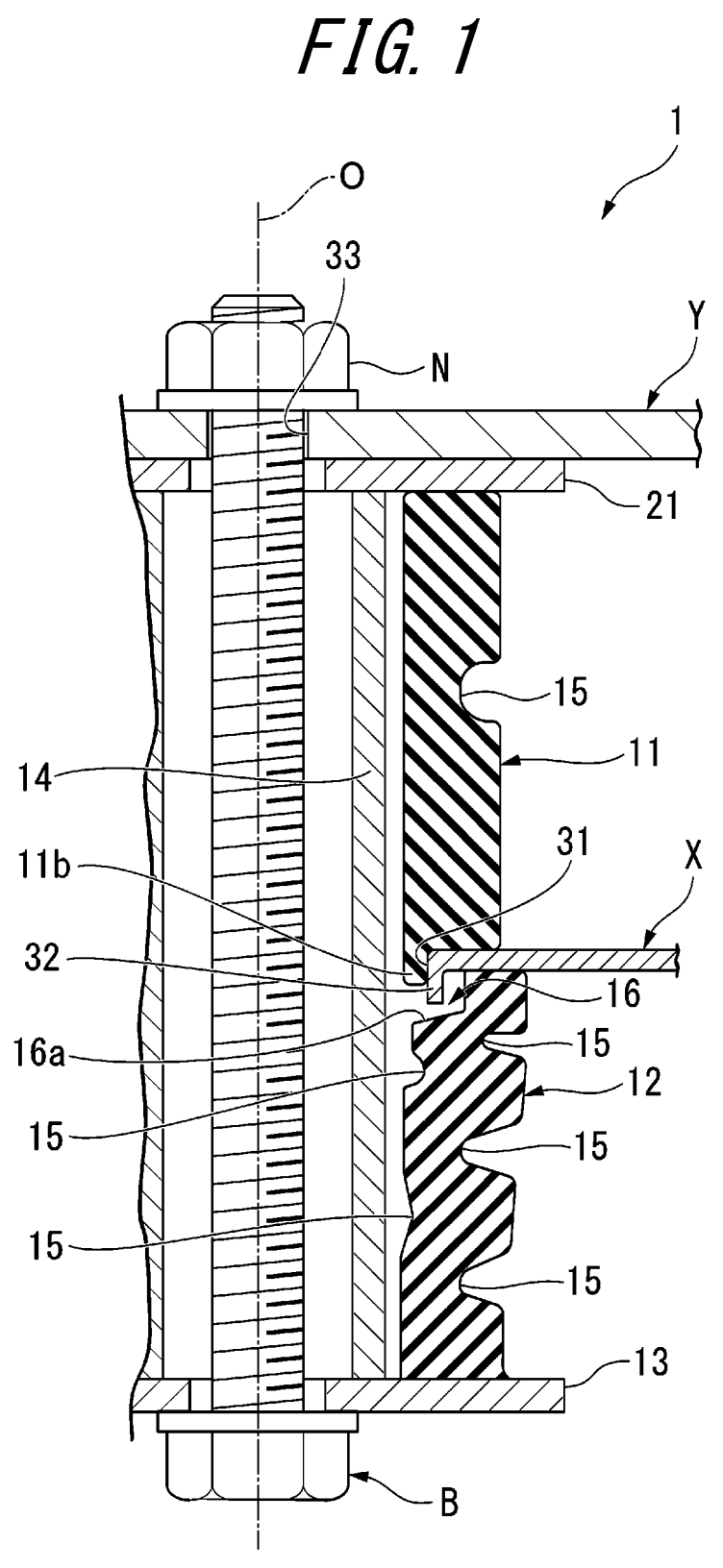
Figure 2:
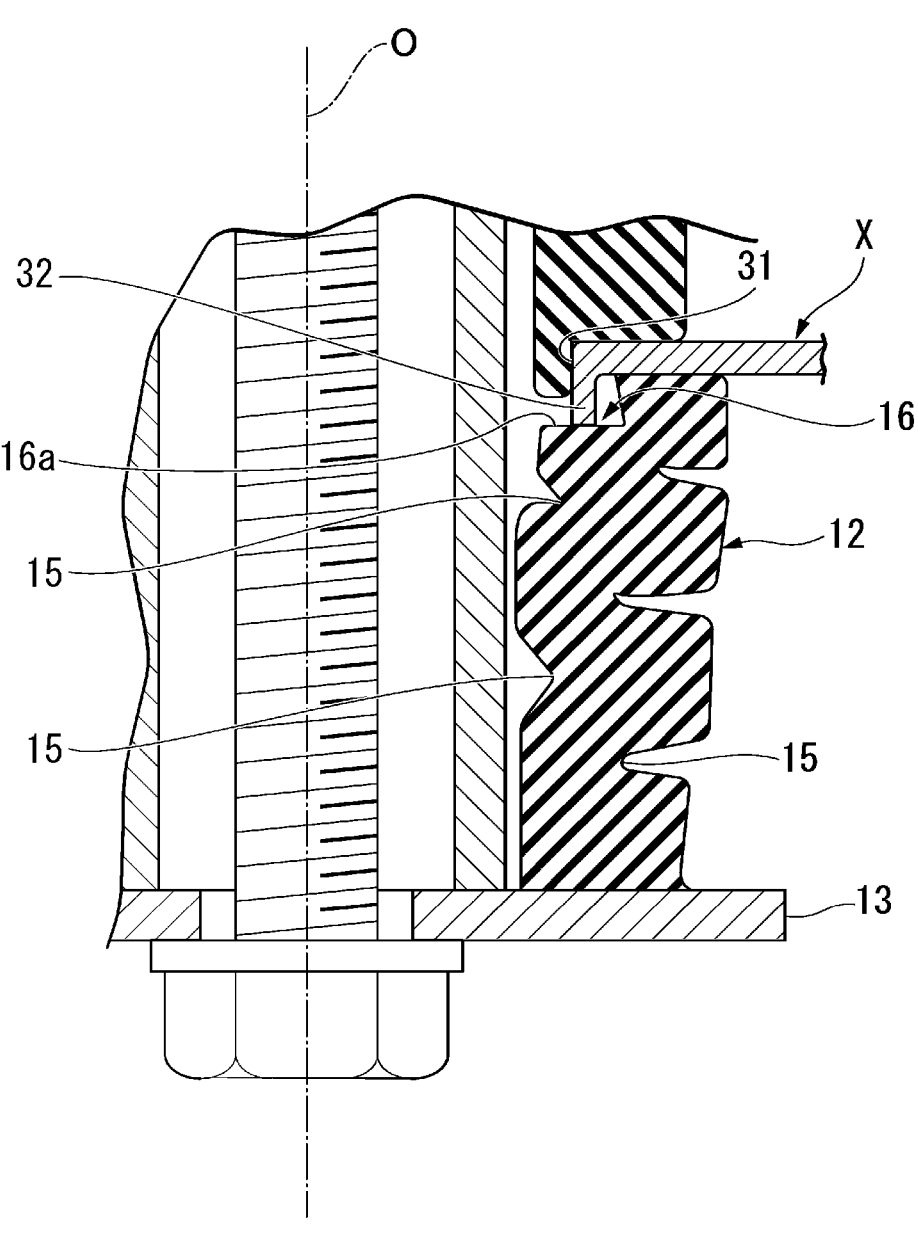
FIG. 2 illustrates a state in which a second anti-vibration rubber cylinder of FIG. 1 is compressed and deformed in a first direction.

An embodiment of an anti-vibration device will be described below with reference to FIG. 1.

The anti-vibration device 1 includes a first anti-vibration rubber cylinder 11, a second anti-vibration rubber cylinder 12, a second support member (support member) 13, and a core cylinder 14. When vibration is input from a vibration generating portion X, the anti-vibration device 1 prevents the input vibration from being transmitted to a vibration receiving portion Y, by elastically deforming the first anti-vibration rubber cylinder 11 and the second anti-vibration rubber cylinder 12. The vibration generating portion X is, for example, a vehicle frame or the like, and the vibration receiving portion Y is, for example, a body or the like.

The first anti-vibration rubber cylinder 11 and the second anti-vibration rubber cylinder 12 are provided with their respective central axes extending in a first direction. In the illustrated example, the first anti-vibration rubber cylinder 11 and the second anti-vibration rubber cylinder 12 are coaxially arranged with a common axis extending in the first direction.

The common axis is hereinafter referred to as a central axis O, and one side toward the first anti-vibration rubber cylinder 11 along the first direction is referred to as an upper side, and another side toward the second anti-vibration rubber cylinder 12 is referred to as a lower side. A direction intersecting the central axis O when viewed from the first direction is called the radial direction, and a direction circling around the central axis O is called a circumferential direction.

The first anti-vibration rubber cylinder 11 connects the vibration generating portion X and the vibration receiving portion Y to each other in the first direction.

In the illustrated example, the vibration generating portion X is provided below the first anti-vibration rubber cylinder 11. The vibration receiving portion Y is provided above the first anti-vibration rubber cylinder 11.

A first support member 21 is attached to a top opening edge of the first anti-vibration rubber cylinder 11. The first support member 21 is formed as an annular plate and is arranged coaxially with the central axis O. The first support member 21 protrudes inward in the radial direction from the top opening edge of the first anti-vibration rubber cylinder 11. The first support member 21 is adhered by vulcanization to the top opening edge of the first anti-vibration rubber cylinder 11. The first anti-vibration rubber cylinder 11 is connected to the vibration receiving portion Y via the first support member 21. The first anti-vibration rubber cylinder 11 is provided in a state in which it is compressed and deformed in the first direction.

Additionally, the first support member 21 may be omitted, and the first anti-vibration rubber cylinder 11 may be directly connected to the vibration receiving portion Y.

A cylindrical cushioning projection 11b, which protrudes downward and inserted into a later-described first communication hole 31 formed in the vibration generating portion X, is formed at a bottom opening edge of the first anti-vibration rubber cylinder 11. The cushioning projection 11b is arranged coaxially with the central axis O.

The second anti-vibration rubber cylinder 12 sandwiches one of the vibration generating portion X and the vibration receiving portion Y in the first direction between the first anti-vibration rubber cylinder 11 and the second anti-vibration rubber cylinder 12.

In the illustrated example, the second anti-vibration rubber cylinder 12 is provided below the first anti-vibration rubber cylinder 11. The second anti-vibration rubber cylinder 12 sandwiches the vibration generating portion X in the first direction between the first anti-vibration rubber cylinder 11 and the second anti-vibration rubber cylinder 12.

A depressed portion 16, which opens inward in the radial direction, is formed at a top opening edge of the second anti-vibration rubber cylinder 12. The radial size of the depressed portion 16 at the top opening edge of the second anti-vibration rubber cylinder 12 is equal to the radial size of part of the second anti-vibration rubber cylinder 12 that is located outward in the radial direction of the depressed portion 16 and that abuts against the vibration generating portion X.

Additionally, it is not essential that the depressed portion 16 be formed in the second anti-vibration rubber cylinder 12.

A second support member 13 sandwiches the second anti-vibration rubber cylinder 12 in the first direction between the vibration generating portion X and the second support member 13. The second support member 13 is attached to a bottom opening edge of the second anti-vibration rubber cylinder 12. The second support member 13 is formed as an annular plate and is arranged coaxially with the central axis O. The second support member 13 protrudes inward in the radial direction from the bottom opening edge of the second anti-vibration rubber cylinder 12. The second support member 13 is adhered by vulcanization to the bottom opening edge of the second anti-vibration rubber cylinder 12. The second anti-vibration rubber cylinder 12 is provided in a state in which it is compressed and deformed in the first direction.

Here, the first communication hole (communication hole) 31, which communicates the inside of the first anti-vibration rubber cylinder 11 with the inside of the second anti-vibration rubber cylinder 12 in the first direction, is formed in the vibration generating portion X, which is sandwiched in the first direction between the first anti-vibration rubber cylinder 11 and the second anti-vibration rubber cylinder 12. The first communication hole 31 is arranged coaxially with the central axis O.

The first communication hole 31 formed in the vibration generating portion X is provided, at an opening peripheral portion thereof, with a stopper cylinder portion 32, which is inserted into the depressed portion 16 of the second anti-vibration rubber cylinder 12. The stopper cylinder portion 32 protrudes downwards from the vibration generating portion X. A bottom opening edge of the stopper cylinder portion 32 is located above and away from a bottom surface 16a of the inner surface of the depressed portion 16 that faces upwards, i.e., toward the vibration generating portion X along the first direction. The bottom opening edge of the stopper cylinder portion 32 faces the bottom surface 16a of the depressed portion 16 in the first direction. The stopper cylinder portion 32 is integrally formed with the vibration generating portion X. The stopper cylinder portion 32 is formed, for example, by burring processing.

Additionally, it is not essential that the stopper cylinder portion 32 be provided in the vibration generating portion X.

The core cylinder 14 is inserted integrally into the first anti-vibration rubber cylinder 11 and into the second anti-vibration rubber cylinder 12 through the first communication hole 31 formed in the vibration generating portion X. The core cylinder 14 is sandwiched in the first direction between the second support member 13 and another one of the vibration generating portion X and the vibration receiving portion Y. In the illustrated example, the core cylinder 14 is sandwiched and secured in the first direction between the first support member 21 and the second support member 13. The core cylinder 14 is connected to the vibration receiving portion Y via the first support member 21. The core cylinder 14 may be joined to one of the first support member 21 and the second support member 13, for example by welding. The core cylinder 14 is arranged coaxially with the central axis O.

Additionally, the core cylinder 14 may be directly connected to the vibration receiving portion Y.

Here, a second communication hole 33, which opens into the first support member 21, is formed in the vibration receiving portion Y. The second communication hole 33 is arranged coaxially with the central axis O.

By fastening a nut N to a bolt B with a head that penetrates the insides of the second communication hole 33, the first support member 21, the core cylinder 14, and the second support member 13 together, the vibration receiving portion Y and the second support member 13 are sandwiched in the first direction.

In the present embodiment, peripheral grooves 15 are formed separately on an outer peripheral surface and an inner peripheral surface of at least one of the first anti-vibration rubber cylinder 11 and the second anti-vibration rubber cylinder 12. The peripheral grooves 15 each extend continuously over the entire circumferential length.

In the illustrated example, a peripheral groove 15 is formed on the outer peripheral surface of the first anti-vibration rubber cylinder 11, and peripheral grooves 15 are formed separately on the outer peripheral surface and the inner peripheral surface of the second anti-vibration rubber cylinder 12.

In the second anti-vibration rubber cylinder 12, the count of peripheral grooves 15 formed on the outer peripheral surface is larger than the count of one or more peripheral grooves 15 formed on the inner peripheral surface. In the illustrated example, the count of the former is three, and that of the latter is two.

The count of the former may be less than or equal to the count of the latter, and the count of each of the former and the latter may be one.

In the second anti-vibration rubber cylinder 12, each of central portions in the first direction of the peripheral grooves 15 formed on the outer peripheral surface is offset in the first direction from each of central portions in the first direction of the peripheral grooves 15 formed on the inner peripheral surface.

In the second anti-vibration rubber cylinder 12, either one of the central portions in the first direction of the peripheral grooves 15 formed on the outer peripheral surface may be located at the same position in the first direction as either one of the central portions in the first direction of the peripheral grooves 15 formed on the inner peripheral surface.

The uppermost peripheral groove 15 and the lowermost peripheral groove 15 in all the peripheral grooves 15 formed in the second anti-vibration rubber cylinder 12 are formed on the outer peripheral surface of the second anti-vibration rubber cylinder 12.

Additionally, the uppermost peripheral groove 15 and the lowermost peripheral groove 15 in all the peripheral grooves 15 formed in the second anti-vibration rubber cylinder 12 may be formed on the inner peripheral surface of the second anti-vibration rubber cylinder 12.

The plurality of peripheral grooves 15 are formed on the inner peripheral surface of the second anti-vibration rubber cylinder 12 with spacing in the first direction. That is, the peripheral grooves 15 formed on the inner peripheral surface of the second anti-vibration rubber cylinder 12 include a plurality of peripheral grooves 15 formed on the inner peripheral surface of the second anti-vibration rubber cylinder 12 with spacing in the first direction. The lowermost peripheral groove 15 in the plurality of peripheral grooves 15 is formed so as to have the largest groove width among all the peripheral grooves 15 formed in the second anti-vibration rubber cylinder 12 and have the smallest depth among all the peripheral grooves 15 formed in the second anti-vibration rubber cylinder 12.

In the illustrated example, the groove width and the depth of the uppermost peripheral groove 15 in the plurality of peripheral grooves 15 formed on the outer peripheral surface of the second anti-vibration rubber cylinder 12 is smaller than the groove widths and the depths of the other peripheral grooves 15.

The groove width of the uppermost peripheral groove 15 in the plurality of peripheral grooves 15 formed on the inner peripheral surface of the second anti-vibration rubber cylinder 12 is equal to the groove width of the uppermost peripheral groove 15 in the plurality of peripheral grooves 15 formed on the outer peripheral surface of the second anti-vibration rubber cylinder 12. The depth of the uppermost peripheral groove in the plurality of peripheral grooves 15 formed on the inner peripheral surface of the second anti-vibration rubber cylinder 12 is shallower than the depth of the uppermost peripheral groove 15 in the plurality of peripheral grooves 15 formed on the outer peripheral surface of the second anti-vibration rubber cylinder 12.

As explained above, according to the anti-vibration device 1 of the present embodiment, upon input of vibration in the first direction, the vibration receiving portion Y and the second support member 13 are displaced in the first direction while elastically deforming the first anti-vibration rubber cylinder 11 and the second anti-vibration rubber cylinder 12. With this configuration, the input vibration is absorbed.

The peripheral grooves 15 are formed on both the outer peripheral surface and the inner peripheral surface of at least one of the first anti-vibration rubber cylinder 11 and the second anti-vibration rubber cylinder 12. With this configuration, when such a rubber cylinder is compressed and deformed in the first direction, a large difference in deformation between the inner peripheral surface side and the outer peripheral surface side of the rubber cylinder can be prevented. Furthermore, the above configuration allows the rubber cylinder to be easily compressed and deformed straight in the first direction, thereby preventing the static spring from being deteriorated due to distortion in the process of compressive deformation in the first direction.

The core cylinder 14 is provided. With this configuration, upon input of vibration in the first direction, the vibration receiving portion Y and the second support member 13 absorb the input vibration, by being displaced in the first direction while elastically deforming the first anti-vibration rubber cylinder 11 and the second anti-vibration rubber cylinder 12, with a distance in the first direction being maintained.

The core cylinder 14 and the stopper cylinder portion 32 are provided. This configuration allows an outer peripheral surface of the core cylinder 14 and an inner peripheral surface of the stopper cylinder portion 32 to abut each other when vibration in a direction intersecting the first direction is input, thereby regulating relative displacement of the vibration generating portion X and the vibration receiving portion Y.

Figure 3:
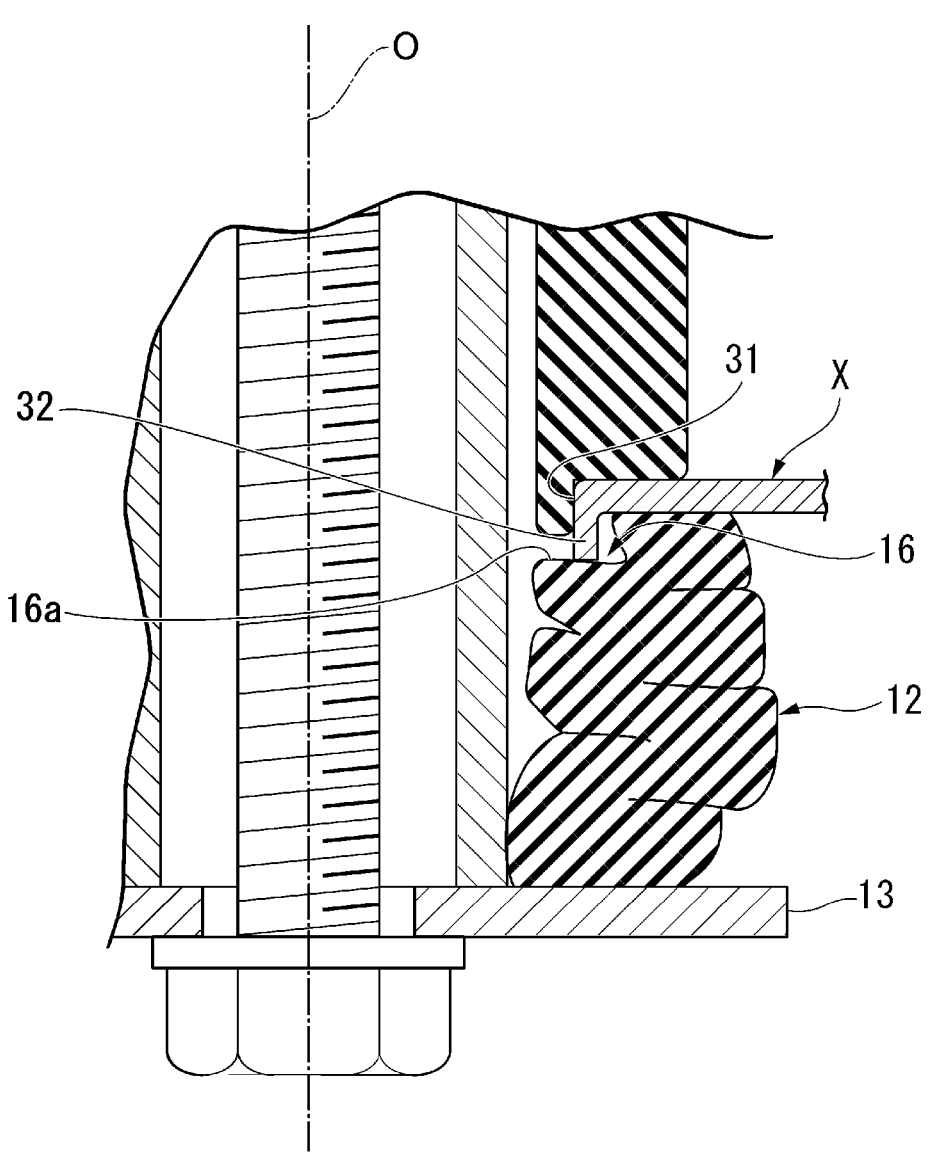
FIG. 3 illustrates a state in which the second anti-vibration rubber cylinder of FIG. 2 is further compressed and deformed in the first direction.

The peripheral grooves 15 are formed separately on the outer peripheral surface and the inner peripheral surface of the second anti-vibration rubber cylinder 12. With this configuration, as illustrated in FIG. 2 and FIG. 3, when the second anti-vibration rubber cylinder 12 is compressed and deformed in the first direction, a large difference in deformation between the inner peripheral surface side and the outer peripheral surface side of the second anti-vibration rubber cylinder 12 can be prevented. Furthermore, the above configuration allows the second anti-vibration rubber cylinder 12 to be easily compressed and deformed straight in the first direction, thereby preventing the static spring from being deteriorated due to distortion in the process of compressive deformation in the first direction.

In this way, the second anti-vibration rubber cylinder 12 can be easily compressed and deformed straight in the first direction. This makes it possible to prevent the second anti-vibration rubber cylinder 12 from being distorted in such a manner that part of the inner peripheral surface side of the second anti-vibration rubber cylinder 12 deforms toward a lower end of the stopper cylinder portion 32, when the second anti-vibration rubber cylinder 12 is compressed and deformed in the first direction, and accordingly, the lower end of the stopper cylinder portion 32 is less likely to bite into the second anti-vibration rubber cylinder 12.

In the second anti-vibration rubber cylinder 12, the count of peripheral grooves 15 formed on the outer peripheral surface is larger than the count of one or more peripheral grooves 15 formed on the inner peripheral surface. This makes it possible to prevent an upper end of the second anti-vibration rubber cylinder 12 from being bent and deformed in such a manner that it expands outward in the radial direction in the process of compressive deformation of the second anti-vibration rubber cylinder 12 in the first direction, even when the depressed portion 16 that opens inward in the radial direction is formed at the top opening edge of the second anti-vibration rubber cylinder 12. This ensures that the second anti-vibration rubber cylinder 12 can be easily compressed and deformed straight in the first direction.

The lowermost peripheral groove 15 (hereinafter, referred to as the "corresponding peripheral groove") in the plurality of peripheral grooves 15 formed on the inner peripheral surface of the second anti-vibration rubber cylinder 12 is formed so as to have the largest groove width among all the peripheral grooves 15 formed in the second anti-vibration rubber cylinder 12 and have the smallest depth among all the peripheral grooves 15 formed in the second anti-vibration rubber cylinder 12.

Consequently, a large compressive deformation allowance along the first direction of the second anti-vibration rubber cylinder 12 can be provided until the corresponding wide and shallow peripheral groove is collapsed in the first direction. This ensures that when the second anti-vibration rubber cylinder 12 is compressed and deformed in the first direction, the second anti-vibration rubber cylinder 12 is prevented from being distorted in such a manner that part of the inner peripheral surface side of the second anti-vibration rubber cylinder 12 deforms toward the lower end of the stopper cylinder portion 32, and moreover, the second anti-vibration rubber cylinder 12 can be easily removed from a mold for vulcanization molding.

The anti-vibration device according to the present disclosure includes : a first anti-vibration rubber cylinder configured to connect a vibration generating portion and a vibration receiving portion to each other in a first direction; a second anti-vibration rubber cylinder configured to sandwich one of the vibration generating portion and the vibration receiving portion in the first direction between the first anti-vibration rubber cylinder and the second anti-vibration rubber cylinder; and a support member configured to sandwich the second anti-vibration rubber cylinder in the first direction between the one of the vibration generating portion and the vibration receiving portion and the support member, wherein the first anti-vibration rubber cylinder and the second anti-vibration rubber cylinder are provided with respective central axes thereof extending in the first direction, and peripheral grooves are formed separately on an outer peripheral surface and an inner peripheral surface of at least one of the first anti-vibration rubber cylinder and the second anti-vibration rubber cylinder.

According to the present disclosure, upon input of vibration in the first direction, another one of the vibration generating portion and the vibration receiving portion and the support member absorb the input vibration, by being displaced in the first direction while elastically deforming the first anti-vibration rubber cylinder and the second anti-vibration rubber cylinder. The peripheral grooves are formed on both the outer peripheral surface and the inner peripheral surface of at least one of the first anti-vibration rubber cylinder and the second anti-vibration rubber cylinder. With this configuration, when such a rubber cylinder is compressed and deformed in the first direction, a large difference in deformation between the inner peripheral surface side and the outer peripheral surface side of the rubber cylinder can be prevented. Furthermore, the above configuration allows the rubber cylinder to be easily compressed and deformed straight in the first direction, thereby preventing the static spring from being deteriorated due to distortion in the process of compressive deformation in the first direction.

A communication hole may be formed in the one of the vibration generating portion and the vibration receiving portion, the communication hole communicating an inside of the first anti-vibration rubber cylinder with an inside of the second anti-vibration rubber cylinder in the first direction. The anti-vibration device may further include a core cylinder configured to be inserted integrally into the first anti-vibration rubber cylinder and into the second anti-vibration rubber cylinder through the communication hole and configured to be sandwiched in the first direction between the support member and the other one of the vibration generating portion and the vibration receiving portion. The peripheral grooves may be formed separately on the outer peripheral surface and the inner peripheral surface of the second anti-vibration rubber cylinder. A depressed portion may be formed at an opening end edge of the second anti-vibration rubber cylinder that is located closer to the one of the vibration generating portion and the vibration receiving portion along the first direction, the depressed portion opening inward in a radial direction. The communication hole formed in the one of the vibration generating portion and the vibration receiving portion may be provided, at an opening peripheral portion thereof, with a stopper cylinder portion that is inserted into the depressed portion.

In this case, since the core cylinder is provided, upon input of vibration in the first direction, the other one of the vibration generating portion and the vibration receiving portion and the support member absorb the input vibration, by being displaced in the first direction while elastically deforming the first anti-vibration rubber cylinder and the second anti-vibration rubber cylinder, with a distance in the first direction being maintained.

The core cylinder and the stopper cylinder portion are provided. This configuration allows an outer peripheral surface of the core cylinder and an inner peripheral surface of the stopper cylinder portion to abut each other when vibration in a direction intersecting the first direction is input, thereby regulating relative displacement of the vibration generating portion and the vibration receiving portion. The peripheral grooves are formed separately on the outer peripheral surface and the inner peripheral surface of the second anti-vibration rubber cylinder. With this configuration, when the second anti-vibration rubber cylinder is compressed and deformed in the first direction, a large difference in deformation between the inner peripheral surface side and the outer peripheral surface side of the second anti-vibration rubber cylinder can be prevented. Furthermore, the above configuration allows the second anti-vibration rubber cylinder to be compressed and deformed straight in the first direction, thereby preventing the static spring from being deteriorated due to distortion in the process of compressive deformation in the first direction.

In this way, the second anti-vibration rubber cylinder can be easily compressed and deformed straight in the first direction. This makes it possible to prevent the second anti-vibration rubber cylinder from being distorted in such a manner that part of the inner peripheral surface side of the second anti-vibration rubber cylinder deforms toward an end of the stopper cylinder portion, when the second anti-vibration rubber cylinder is compressed and deformed in the first direction, and accordingly, the end of the stopper cylinder portion is less likely to bite into the second anti-vibration rubber cylinder.

In the second anti-vibration rubber cylinder, a count of peripheral grooves formed on the outer peripheral surface may be larger than a count of one or more peripheral grooves formed on the inner peripheral surface.

In this case, in the second anti-vibration rubber cylinder, the count of peripheral grooves formed on the outer peripheral surface is larger than the count of one or more peripheral grooves formed on the inner peripheral surface. This makes it possible to prevent an end of the second anti-vibration rubber cylinder that is located closer to the one of the vibration generating portion and the vibration receiving portion along the first direction from being bent and deformed in such a manner that it expands outward in the radial direction in the process of compressive deformation of the second anti-vibration rubber cylinder in the first direction, even when the depressed portion that opens inward in the radial direction is formed at the opening end edge of the second anti-vibration rubber cylinder that is located closer to the one of the vibration generating portion and the vibration receiving portion along the first direction. This ensures that the second anti-vibration rubber cylinder can be easily compressed and deformed straight in the first direction.

The one or more peripheral grooves formed on the inner peripheral surface of the second anti-vibration rubber cylinder may include a plurality of peripheral grooves formed on the inner peripheral surface of the second anti-vibration rubber cylinder with spacing in the first direction. A peripheral groove in the plurality of peripheral grooves that is located closest to the support member along the first direction may be formed so as to have a largest groove width among all the peripheral grooves formed in the second anti-vibration rubber cylinder and have a smallest depth among all the peripheral grooves formed in the second anti-vibration rubber cylinder.

In this case, the peripheral groove (hereinafter, referred to as the "corresponding peripheral groove") in the plurality of peripheral grooves formed on the inner peripheral surface of the second anti-vibration rubber cylinder that is located closest to the support member along the first direction is formed so as to have the largest groove width among all the peripheral grooves formed in the second anti-vibration rubber cylinder and have the smallest depth among all the peripheral grooves formed in the second anti-vibration rubber cylinder. Consequently, a large compressive deformation allowance along the first direction of the second anti-vibration rubber cylinder can be provided until the corresponding wide and shallow peripheral groove is collapsed in the first direction. This ensures that when the second anti-vibration rubber cylinder is compressed and deformed in the first direction, the second anti-vibration rubber cylinder is prevented from being distorted in such a manner that part of the inner peripheral surface side of the second anti-vibration rubber cylinder deforms toward the end of the stopper cylinder portion, and moreover, the second anti-vibration rubber cylinder can be easily removed from a mold for vulcanization molding.

The technical scope of the present disclosure is not limited to the above embodiment, and various changes can be made without departing from the gist of the present disclosure.

For example, the first direction may be a direction intersecting a vertical direction, and the orientation of the anti-vibration device 1 with respect to the vehicle may be changed as needed.

The core cylinder 14 and the stopper cylinder portion 32 may be omitted.

All the peripheral grooves 15 formed in the second anti-vibration rubber cylinder 12 may have the same size as each other. Peripheral grooves 15 may be formed separately on the outer peripheral surface and the inner peripheral surface of the first anti-vibration rubber cylinder 11.

The vibration receiving portion Y may be sandwiched in the first direction between the second anti-vibration rubber cylinder 12 and the first anti-vibration rubber cylinder 11, and the stopper cylinder portion 32, which is inserted into the depressed portion 16 of the second anti-vibration rubber cylinder 12, may be provided at an opening peripheral portion of the second communication hole 33 formed in the vibration receiving portion Y.

The anti-vibration device 1 is not limited to a cabin mount for a vehicle, and can be applied, for example, to a member mount for a vehicle, a mount for a generator installed in a construction machine, a mount for a machine installed in a factory or the like, and so on.

In addition, it is possible to replace the components in the above embodiment with known components as needed without departing from the gist of the present disclosure, and the above embodiment and modifications may be suitably combined.

INDUSTRIAL APPLICABILITY

According to the present disclosure, at least one of the first anti-vibration rubber cylinder and the second anti-vibration rubber cylinder can be easily compressed and deformed straight in the first direction.

REFERENCE SIGNS LIST

1 Anti-vibration device
11 First anti-vibration rubber cylinder
12 Second anti-vibration rubber cylinder
13 Second support member (support member)
14 Core cylinder
15 Peripheral groove
16 Depressed portion
21 First support member
31 First communication hole (communication hole)
32 Stopper cylinder portion
33 Second communication hole
O Central axis
X Vibration generating portion
Y Vibration receiving portion

The invention claimed is:

1. An anti-vibration device comprising:
   a first anti-vibration rubber cylinder configured to connect a vibration generating portion and a vibration receiving portion to each other in a first direction;
   a second anti-vibration rubber cylinder configured to sandwich one of the vibration generating portion and the vibration receiving portion in the first direction between the first anti-vibration rubber cylinder and the second anti-vibration rubber cylinder; and
   a support member configured to sandwich the second anti-vibration rubber cylinder in the first direction between the one of the vibration generating portion and the vibration receiving portion and the support member, wherein
   the first anti-vibration rubber cylinder and the second anti-vibration rubber cylinder are provided with respective central axes thereof extending in the first direction,
   peripheral grooves are formed separately on an outer peripheral surface and an inner peripheral surface of at least one of the first anti-vibration rubber cylinder and the second anti-vibration rubber cylinder, and a communication hole is formed in the one of the vibration generating portion and the vibration receiving portion, the communication hole communicating an inside of the first anti-vibration rubber cylinder with an inside of the second anti-vibration rubber cylinder in the first direction, the anti-vibration device further includes a core cylinder configured to be inserted integrally into the first anti-vibration rubber cylinder and into the second anti-vibration rubber cylinder through the communication hole and configured to be sandwiched in the first direction between the support member and another one of the vibration generating portion and the vibration receiving portion, wherein the peripheral grooves are formed separately on the outer peripheral surface and the inner peripheral surface of the second anti-vibration rubber cylinder, a depressed portion is formed at an opening end edge of the second anti-vibration rubber cylinder that is located closer to the one of the vibration generating portion and the vibration receiving portion along the first direction, the depressed portion opening inward in a radial direction, the communication hole formed in the one of the vibration generating portion and the vibration receiving portion is provided, at an opening peripheral portion thereof, with a stopper cylinder portion that is inserted into the depressed portion, and in the second anti-vibration rubber cylinder, a count of peripheral grooves formed on the outer peripheral surface is larger than a count of one or more peripheral grooves formed on the inner peripheral surface.

2. The anti-vibration device according to claim 1, wherein the one or more peripheral grooves formed on the inner peripheral surface of the second anti-vibration rubber cylinder include a plurality of peripheral grooves formed on the inner peripheral surface of the second anti-vibration rubber cylinder with spacing in the first direction, and a peripheral groove in the plurality of peripheral grooves that is located closest to the support member along the first direction is formed so as to have a largest groove width among all the peripheral grooves formed in the second anti-vibration rubber cylinder and have a smallest depth among all the peripheral grooves formed in the second anti-vibration rubber cylinder.

* * * * *